United States Patent
Khoshnevisan et al.

(10) Patent No.: US 12,483,317 B2
(45) Date of Patent: Nov. 25, 2025

(54) CHANNEL STATE INFORMATION-REFERENCE SIGNAL RESOURCES WITH MULTIPLE TRANSMISSION CONFIGURATION INDICATION STATES

(71) Applicants: QUALCOMM Incorporated, San Diego, CA (US); Mostafa Khoshnevisan, San Diego, CA (US); Chenxi Hao, Beijing (CN); Yu Zhang, San Diego, CA (US); Xiaoxia Zhang, San Diego, CA (US); Hao Xu, Beijing (CN)

(72) Inventors: Mostafa Khoshnevisan, San Diego, CA (US); Chenxi Hao, Beijing (CN); Yu Zhang, San Diego, CA (US); Xiaoxia Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 17/905,630

(22) PCT Filed: Mar. 3, 2020

(86) PCT No.: PCT/CN2020/077558
§ 371 (c)(1),
(2) Date: Sep. 2, 2022

(87) PCT Pub. No.: WO2021/174409
PCT Pub. Date: Sep. 10, 2021

(65) Prior Publication Data
US 2023/0171062 A1    Jun. 1, 2023

(51) Int. Cl.
*H04B 7/06* (2006.01)
*H04L 5/00* (2006.01)
(Continued)

(52) U.S. Cl.
CPC ....... *H04B 7/06968* (2023.05); *H04B 7/0626* (2013.01); *H04L 5/0051* (2013.01);
(Continued)

(58) Field of Classification Search
CPC ... H04L 5/0051; H04L 5/0057; H04L 5/0085; H04L 5/0094; H04L 5/001; H04L 5/1469;
(Continued)

(56) References Cited

U.S. PATENT DOCUMENTS

2019/0115955 A1    4/2019  John Wilson et al.
2019/0141691 A1*   5/2019  Kwon ...................... H04L 5/00
(Continued)

FOREIGN PATENT DOCUMENTS

CN    110474724 A    11/2019
CN    110839290 A    2/2020
(Continued)

OTHER PUBLICATIONS

Ericsson: "On Beam Indication, Measurement, and Reporting", 3GPP TSG-RAN WG1 NR Ad Hoc #3, R1-1716350, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051339805, pp. 1-13, section 2.
(Continued)

*Primary Examiner* — Harry H Kim
(74) *Attorney, Agent, or Firm* — NORTON ROSE FULBRIGHT US LLP

(57) ABSTRACT

Channel state information-reference signal (CSI-RS) resources are disclosed with multiple transmission configuration indication (TCI) states. Example aspects of the present disclosure provide for indications that a given CSI-RS resource is associated with multiple TCI states within various configuration control signaling, depending on whether
(Continued)

the CSI-RS is periodic, semi-persistent, or aperiodic. Additionally, where any trigger state corresponds to a CSI-RS resource set in which one or more CSI-RS resources are associated with multiple TCI states, one or more quasi-co-location (QCL) assumptions of the downlink transmission may also be applied by a user equipment (UE) to reception of the CSI-RS resources, where the scheduling offset is less than the threshold beam switch timing reported by the UE.

34 Claims, 11 Drawing Sheets

(51) Int. Cl.
  *H04L 5/14* (2006.01)
  *H04L 5/16* (2006.01)
(52) U.S. Cl.
  CPC .......... *H04L 5/0057* (2013.01); *H04L 5/0085* (2013.01); *H04L 5/0094* (2013.01)
(58) Field of Classification Search
  CPC ....... H04L 5/0023; H04L 5/16; H04L 5/0048; H04B 7/0626; H04B 7/0695
  See application file for complete search history.

(56) References Cited

U.S. PATENT DOCUMENTS

| | | | |
|---|---|---|---|
| 2020/0366433 A1* | 11/2020 | Qin | H04L 5/0048 |
| 2021/0258809 A1 | 8/2021 | Gao et al. | |
| 2023/0007667 A1* | 1/2023 | Matsumura | H04W 72/54 |

FOREIGN PATENT DOCUMENTS

| | | |
|---|---|---|
| WO | WO-2019099659 A1 | 5/2019 |
| WO | WO-2019137441 A1 | 7/2019 |

OTHER PUBLICATIONS

Qualcomm Incorporated: "Beam Management for NR", 3GPP TSG-RAN WG1 Meeting #94, R1-1809711, 3GPP, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, 16 Pages, Aug. 17, 2018, XP051517061, Sections 6, 9, 11 and 12, p. 4, "Text Proposal 38.214 Subclause 5.1.5", Sections 5, 7 and 20, pp. 1, 14, sections 7, 25.
Supplementary European Search Report—EP20922909—Search Authority—Munich—Oct. 30, 2023.
Zte, et al., "Details and Evaluation Results on Beam Indication", 3GPP TSG RAN WG1 Meeting #91, R1-1719538, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051369352, 11 Pages, section 2.
International Search Report and Written Opinion—PCT/CN2020/077558—ISAEPO—Dec. 4, 2020.
Nokia, et al., "Summary of QCL", 3GPP Draft, 3GPP TSG-RAN WG1 Meeting #90bis, R1-1718863, Prague, Czech Republic, Oct. 9-13, 2017, Oct. 13, 2017 (Oct. 13, 2017), 21 Pages, the whole document.
Zte, et al., "Discussion on the Configuration of the Cell Info and CSI-RS-for-Tracking in TCI State", 3GPP Draft, 3GPP TSG-RAN WG2 Meeting #101bis, R2-1804375, Apr. 20, 2018 (Apr. 20, 2018), 5 Pages, The Whole Document.
Nokia, et al., "Summary of offline on MAC CEs definition for NR MIMO", R2-1803971, 3GPP TSG-RAN WG2 #101, Athens, Greece, Feb. 26-Mar. 2, 2018, 14 Pages, Section 2.
ZTE: "Further Details on Multi-beam/TRP Operation", R1-1910287, 3GPP TSG RAN WG1 Meeting #98bis Chongqing, China, Oct. 14-20, 2019, Oct. 5, 2019, 16 Pages, Section 2.1.3, 3.1.2.

* cited by examiner

CHANNEL STATE INFORMATION-REFERENCE SIGNAL RESOURCES WITH MULTIPLE TRANSMISSION CONFIGURATION INDICATION STATES

BACKGROUND

Field

Aspects of the present disclosure relate generally to wireless communication systems, and more particularly, to channel state information-reference signal (CSI-RS) resources with multiple transmission configuration indication (TCI) states.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a channel state information-reference signal (CSI-RS) resource configuration, wherein at least one CSI-RS resource of a plurality of CSI-RS resources defined in a CSI-RS resource set is associated with at least two transmission configuration indicator (TCI) states, identifying, by the UE, a CSI-RS resource of the plurality of CSI-RS resources, and receiving, by the UE, the CSI-RS resource using a quasi-co-location (QCL) assumption corresponding to one or more TCI states associated with the CSI-RS resource.

In an additional aspect of the disclosure, a method of wireless communication includes receiving, by a UE, a radio resource control (RRC) message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states, receiving, by the UE, a triggering downlink control information (DCI) identifying the trigger state that identifies at least one CSI-RS resource of the CSI-RS resource set associated with the at least two TCI states, determining, by the UE, a relationship between a scheduling offset and a threshold beam switch time reported by the UE, and applying, by the UE, one or more quasi-co-location (QCL) assumptions according to the relationship for reception of the CSI-RS resource.

In an additional aspect of the disclosure, an apparatus configured for wireless communication includes means for receiving, by a UE, a CSI-RS resource configuration, wherein at least one CSI-RS resource of a plurality of CSI-RS resources defined in a CSI-RS resource set is associated with at least two TCI states, means for identifying, by the UE, a CSI-RS resource of the plurality of CSI-RS resources, and means for receiving, by the UE, the CSI-RS resource using a QCL assumption corresponding to one or more TCI states associated with the CSI-RS resource.

In an additional aspect of the disclosure, an apparatus configured for wireless communication includes means for receiving, by a UE, a RRC message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states, means for receiving, by the UE, a triggering DCI identifying the trigger state that identifies at least one CSI-RS resource of the CSI-RS resource set associated with the at least two TCI states, means for determining, by the UE, a relationship between a scheduling offset and a threshold beam switch time reported by the UE, and means for applying, by the UE, one or more QCL assumptions according to the relationship for reception of the CSI-RS resource.

In an additional aspect of the disclosure, a non-transitory computer-readable medium having program code recorded thereon. The program code further includes code to receive, by a UE, a CSI-RS resource configuration, wherein at least one CSI-RS resource of a plurality of CSI-RS resources defined in a CSI-RS resource set is associated with at least two TCI states, code to identify, by the UE, a CSI-RS resource of the plurality of CSI-RS resources, and code to receive, by the UE, the CSI-RS resource using a QCL assumption corresponding to one or more TCI states associated with the CSI-RS resource.

In an additional aspect of the disclosure, a non-transitory computer-readable medium having program code recorded thereon. The program code further includes code to receive, by a UE, a RRC message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states, code to receive, by the UE, a triggering DCI identifying the trigger state that identifies at least one CSI-RS resource of the CSI-RS resource set associated with the at least two TCI states, code to determine, by the UE, a relationship between a scheduling offset and a threshold beam switch time reported by the UE, and code to apply, by the UE, one or more QCL assumptions according to the relationship for reception of the CSI-RS resource.

In an additional aspect of the disclosure, an apparatus configured for wireless communication is disclosed. The apparatus includes at least one processor, and a memory coupled to the processor. The processor is configured to receive, by a UE, a CSI-RS resource configuration, wherein at least one CSI-RS resource of a plurality of CSI-RS resources defined in a CSI-RS resource set is associated with at least two TCI states, to identify, by the UE, a CSI-RS resource of the plurality of CSI-RS resources, and to receive, by the UE, the CSI-RS resource using a QCL assumption corresponding to one or more TCI states associated with the CSI-RS resource.

In an additional aspect of the disclosure, an apparatus configured for wireless communication is disclosed. The apparatus includes at least one processor, and a memory coupled to the processor. The processor is configured to receive, by a UE, a RRC message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states, to receive, by the UE, a triggering DCI identifying the trigger state that identifies at least one CSI-RS resource of the CSI-RS resource set associated with the at least two TCI states, to determine, by the UE, a relationship between a scheduling offset and a threshold beam switch time reported by the UE, and to apply, by the UE, one or more QCL assumptions according to the relationship for reception of the CSI-RS resource.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
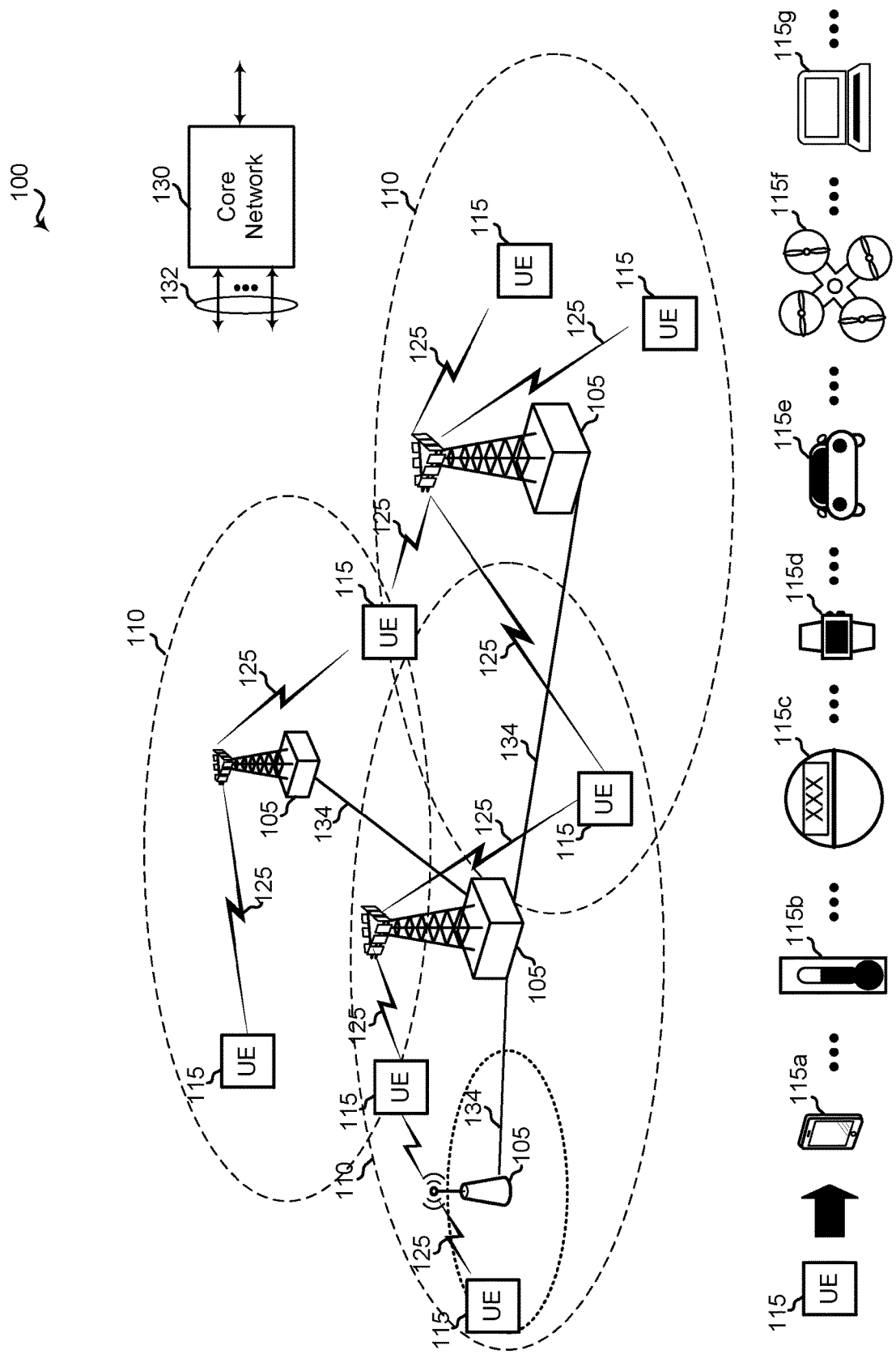
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports configuration of channel state information-reference signal (CSI-RS) resources with multiple transmission configuration indicator (TCI) states in accordance with aspects of the present disclosure. In accordance with the described aspects, a UE may receive a CSI-RS resource configuration, wherein at least one CSI-RS resource of a plurality of CSI-RS resources defined in a CSI-RS resource set configured in the CSI-RS resource confirmation is associated with at least two TCI states. The UE may then identify a CSI-RS resource of the plurality of CSI-RS resources and decode the CSI-RS resource using a quasi-co-location (QCL) assumption corresponding to one or more TCI states associated with the CSI-RS resource. In additional aspects, the QCL assumption used may be based on a relationship between the scheduled offset and a beam switch time reported by the UE. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115*a*), a personal digital assistant (PDA), a wearable device (UE 115*d*), a tablet computer, a laptop computer (UE 115*g*), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115*e* and UE 115*f*), meters (UE 115*b* and UE 115*c*), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.)

and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
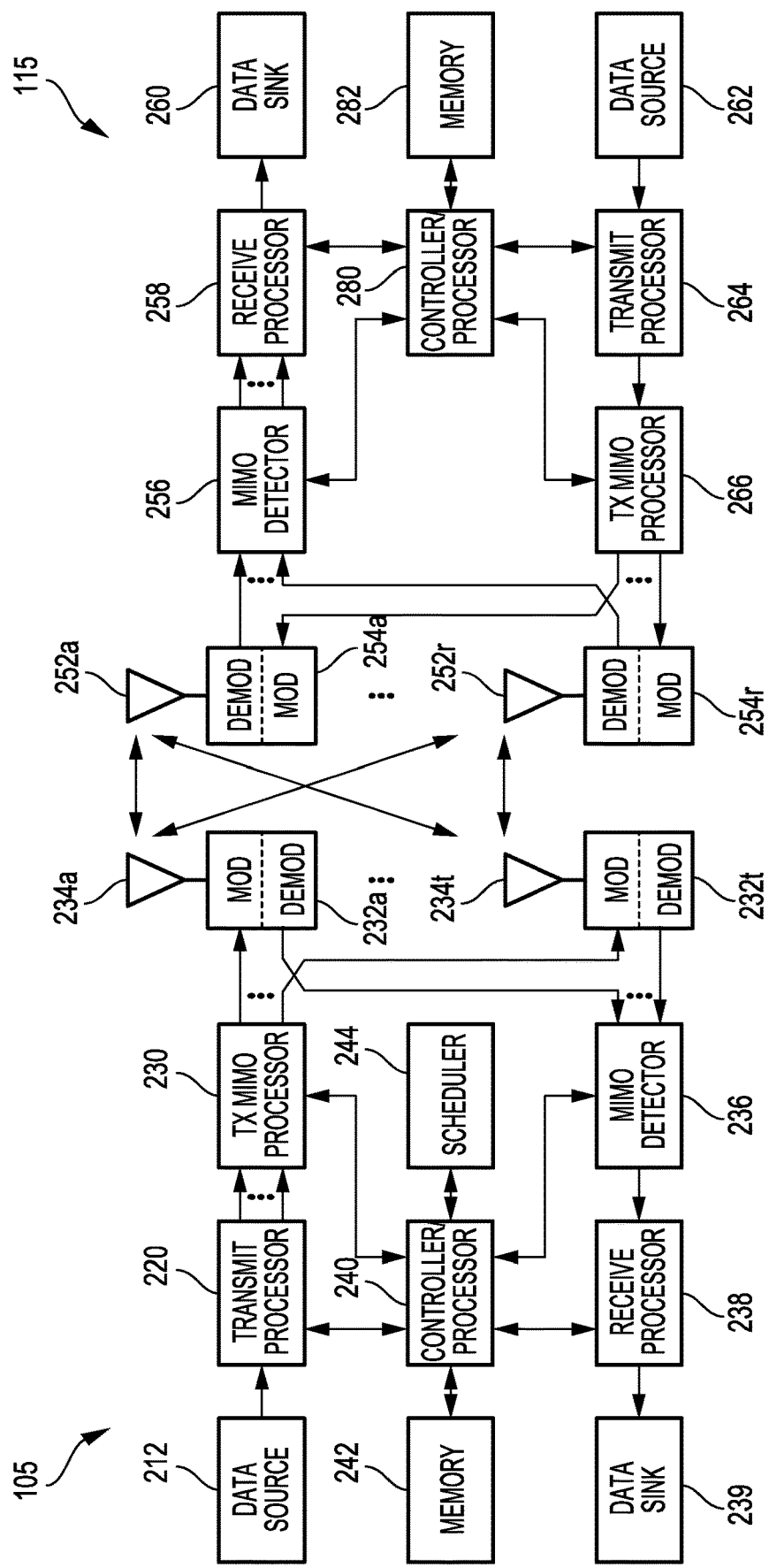
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 6, and/or other processes for the techniques described herein. The memories 242 and 282 may store data and program codes for the base station 105 and the UE 115, respectively. A scheduler 244 may schedule UEs for data transmission on the downlink and/or uplink.

In general, two signals transmitted from the same antenna port may experience the same radio channel, while these same signals transmitted from two different antenna ports may experience different radio conditions. There can be scenarios in which signals transmitted from two different antenna ports experience radio channels having common properties. In such cases the antenna ports can be characterized as quasi-co-located (QCL). This QCL concept has been introduced to potentially help UEs with various operations, such as channel estimation, frequency offset error estimation, synchronization procedures, and the like. For example, if the UE knows that the radio channels corresponding to two different antenna ports are QCL in terms of Doppler shift, then the UE could determine the Doppler shift associated with one antenna port and apply the result on both antenna ports for channel estimation. Using the QCL concept, the UE avoids calculating the Doppler shift for both antenna ports separately.

The different properties that may be common across antenna ports includes Doppler spread/shift, average delay, delay spread, average gain, and spatial receiver parameters. These properties are referred to as the large-scale properties of the antennas port. The specific combinations of large-scale properties that may be shared across various antenna ports have been grouped into four QCL types. QCL-Type A includes the common properties of Doppler shift, Doppler spread, average delay, and delay spread and has been applied for obtaining channel state information (CSI). QCL-Type B includes Doppler shift and Doppler spread and has also been applied for obtaining CSI. QCL-Type C includes average delay and delay spread and has been applied to obtain various measurement information, such as reference signal receive power (RSRP). QCL-Type D includes the spatial receiver parameter and has been applied to support beamforming.

The QCL concept may be used to support reception of various downlink signals at a UE. For example, QCL may be used by a UE to support reception of CSI-reference signal (CSI-RS) resources for CSI reporting. A base station may signal configuration information to the UE to configure transmission configuration indication (TCI) states that are associated with the particular QCL assumption. The means with which the base station communicates such configuration information may depend on whether the CSI reporting is periodic, semi-persistent, or aperiodic.

Figure 3A:
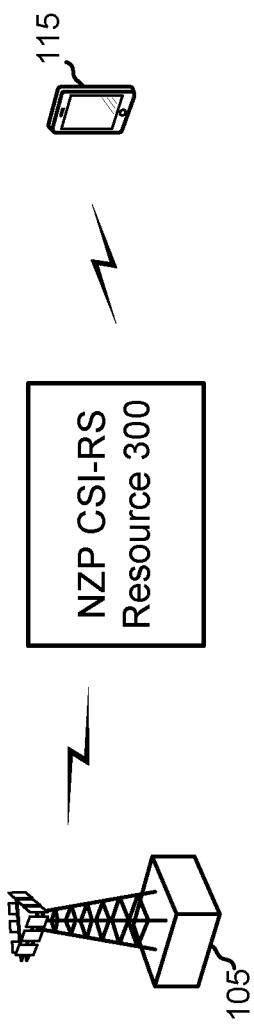
FIG. 3A is a block diagram illustrating a base station signaling periodic CSI-RS configuration information to a UE.

FIG. 3A is a block diagram illustrating a base station 105 signaling periodic CSI-RS configuration information to a UE 115. For periodic CSI-RS, base station 105 may directly configure the TCI state identifier (ID) per CSI-RS resource, such as via radio resource control (RRC) signaling of non-zero power (NZP) CSI-RS resource configuration 300. NZP CSI-RS resource configuration 300 includes the configuration information for the periodic CSI-RS resources including the TCI state ID associated with the CSI-RS resource. The TCI state ID corresponds to a particular QCL assumption or QCL type for that CSI-RS resource.

Figure 3B:
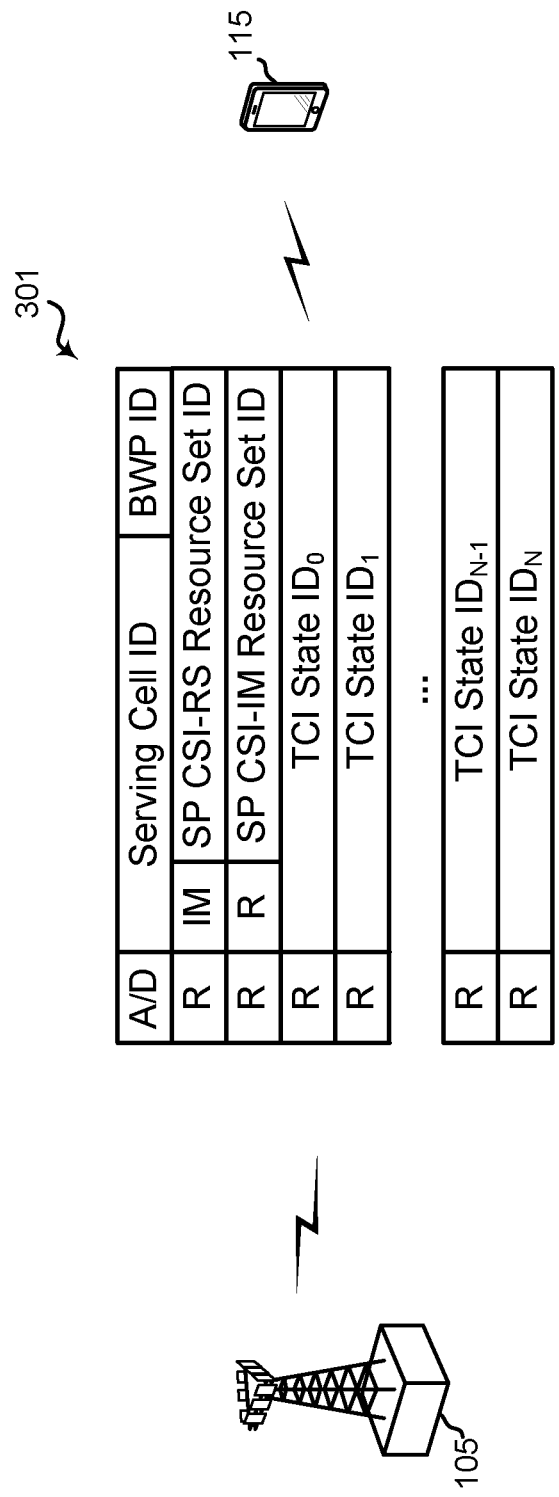
FIG. 3B is a block diagram illustrating a base station signaling semi-persistent CSI-RS configuration information to a UE.

FIG. 3B is a block diagram illustrating base station 105 signaling semi-persistent CSI-RS configuration information to UE 115. For semi-persistent CSI-RS resources, base station 105 would initially signal an RRC configuration message, similar to NZP CSI-RS resource configuration 300 (FIG. 3A), that configures the available semi-persistent CSI-RS resources at a given periodicity and offset. However, for the semi-persistent CSI-RS resources, a medium access control-control element (MAC-CE) 301 may be transmitted by base station 105 to UE 115 which activates a specific semi-persistent CSI-RS resource set and configures the TCI state ID for each semi-persistent CSI-RS resource defined in the semi-persistent CSI-RS resource set. As illustrated, MAC-CE 301 includes TCI state $ID_0$ associated with the first semi-persistent CSI-RS resource within the resource set, TCI state $ID_1$ associated with the second semi-persistent CSI-RS resource of the resource set. Assuming N semi-persistent CSI-RS resources within the resource set, MAC-CE 301 includes TCI states up to TCI state $ID_{N-1}$ and TCI state $ID_N$ for the final two semi-persistent CSI-RS resources in the resource set. These TCI state ID fields of MAC-CE 301 are present when the activation/deactivation field (A/D) is set to 1 or activated. If A/D is set to 0, MAC-CE 301 would not include the TCI state ID fields.

Figure 3C:
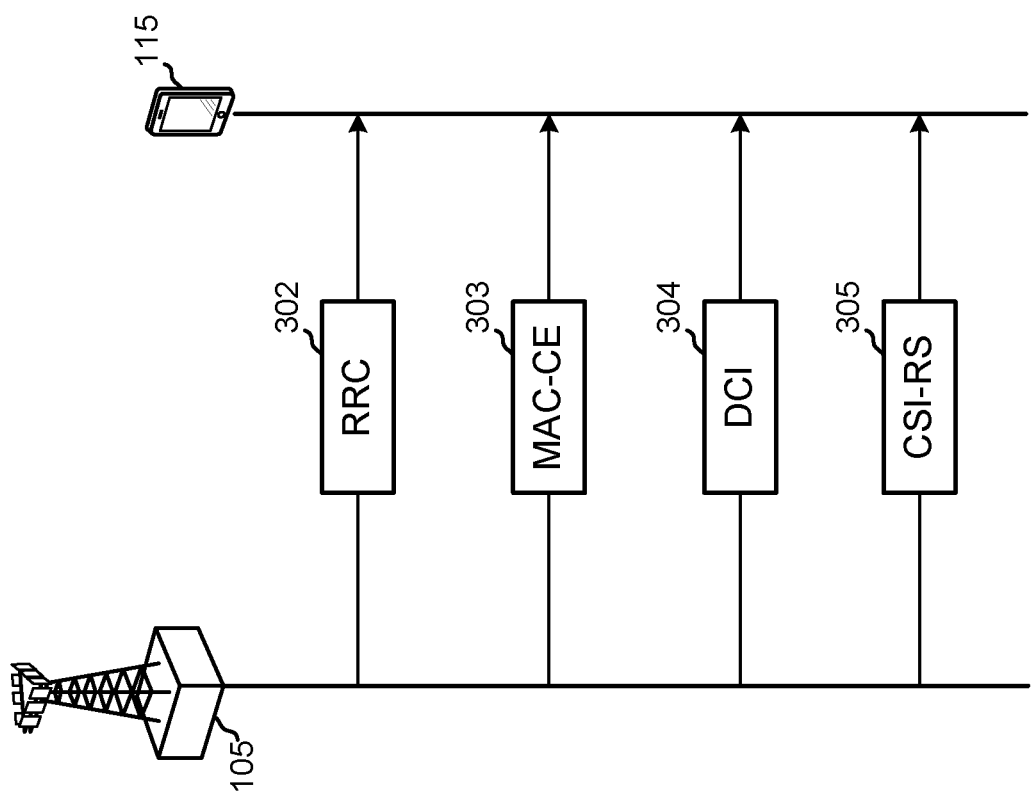
FIG. 3C is a block diagram illustrating a base station signaling aperiodic CSI-RS configuration information to a UE.

FIG. 3C is a call flow diagram illustrating communications for configuration of aperiodic CSI-RS resources with associated TCI states between base station 105 and UE 115. Base station 105 begins configuration of the aperiodic CSI-RS resources with configuration of a set of trigger states for UE 115 via RRC signaling 302. Up to 128 trigger states can be configured via such higher layer signaling, RRC signaling 302. Each trigger state in the list may further be association to one or more report settings (e.g., up to a maximum of 16). Each such report setting may be linked through a CSI report configuration ID, in which one CSI-RS resource set may be configured. Each such CSI-RS resource set may include multiple CSI-RS resources. The TCI state for each of these CSI-RS resources may be indicated as part of the trigger state configuration.

While RRC signaling 302 configures the set of trigger states, an intermediate message, MAC-CE 303, may activate or deactivate ones of the trigger states. The sub-set of activated trigger states are combined into TCI codepoints. The aperiodic CSI report on the uplink shared channel is actually triggered via the CSI request field in an uplink DCI, such as DCI 304. If the "CSI request" field of DCI 304 has N bits, $2^N-1$ trigger states may be activated through MAC-CE 303. For example, with N=6, the activation of trigger states by MAC-CE 303 would map to a maximum of 63 TCI codepoints. Similarly, if N=4, the MAC-CE 303 could map to a maximum of 15 TCI codepoints. The special case, where all N bits of the CSI request field in DCI 304 are 0, indicates that no CSI report is triggered. The "−1" of $2^N-1$ is the removal of this special case from the maximum TCI codepoints.

TABLE 1

| CSI Request Field Value | First Associated Report Configuration Config ID0 | Second Associated Report Configuration Config ID1 |
|---|---|---|
| 1 | CSI-ReportConfigId; resource set in the report configuration; {TCI state 1, TCI state 2, . . . } for each of the CSI-RS resources of the resource set | — |
| . . . | . . . | . . . |
| 63 | CSI-ReportConfigId; resource set in the report configuration; {TCI state 1, TCI state 2, . . . } for each of the CSI-RS resources of the resource set | CSI-ReportConfigId; resource set in the report configuration; {TCI state 1, TCI state 2, . . . } for each of the CSI-RS resources of the resource set |

The CSI request field of DCI 304 may indicate one trigger state. Table 1 above shows an example for 63 trigger states (N=6) after the sub-selection indication by MAC-CE 303. For example, if the CSI request field of DCI 304 indicates '1,' then, according to Table 1, the CSI report may be multiplexed on PUSCH corresponding to the best hypothesis in the resource set, where each CSI-RS resource in the resource set corresponds to one hypothesis. Alternatively, if the CSI request field of DCI 304 indicates '63,' then two CSI reports are multiplexed on PUSCH according to the Config ID0 and Config ID1, as identified in Table 1.

The trigger state configuration identified in DCI 304 allows UE 115 to determine the CSI-RS resource and associated TCI state ID. Based on the TCI state ID, UE 115 may determine the QCL assumption to apply when receiving CSI-RS resource 305. Thus, UE 115 determines the QCL assumption and uses it to help decode CSI-RS resource 305.

In 3GPP Release 17 (Rel. 17), one of the objectives of further enhanced multiple input, multiple output (FeMIMO) technologies is non-coherent joint transmission (NCJT) CSI for multiple transmission-reception points (mTRP). An NCJT CSI report may correspond to a CSI report for more than one TCI state. It should be noted that, in 3GPP Release 15 (Rel. 15), one CSI hypothesis may be selected out of multiple TCI states, corresponding to the multiple CSI resources in a resource set, but each CSI report would correspond to a single TCI state. In one suggested implementation for a CSI report for more than one TCI state, a CSI report is allowed to correspond to a pair of CSI-RS resources. In a second suggested implementation, two or more TCI states may be allowed for definition per CSR-RS resource. In this second suggested implementation, some of the ports of the CSI-RS resources may be associated with a first TCI state, referred to as the first port group, and the other ports of the CSI-RS resources may be associated with a second TCI state, referred to as the second port group. Thus, a single CSI-RS resource can have more than one TCI state. Determinations of the multiple TCI states would occur for each of periodic, semi-persistent, and aperiodic CSI-RS resources.

Figure 4:
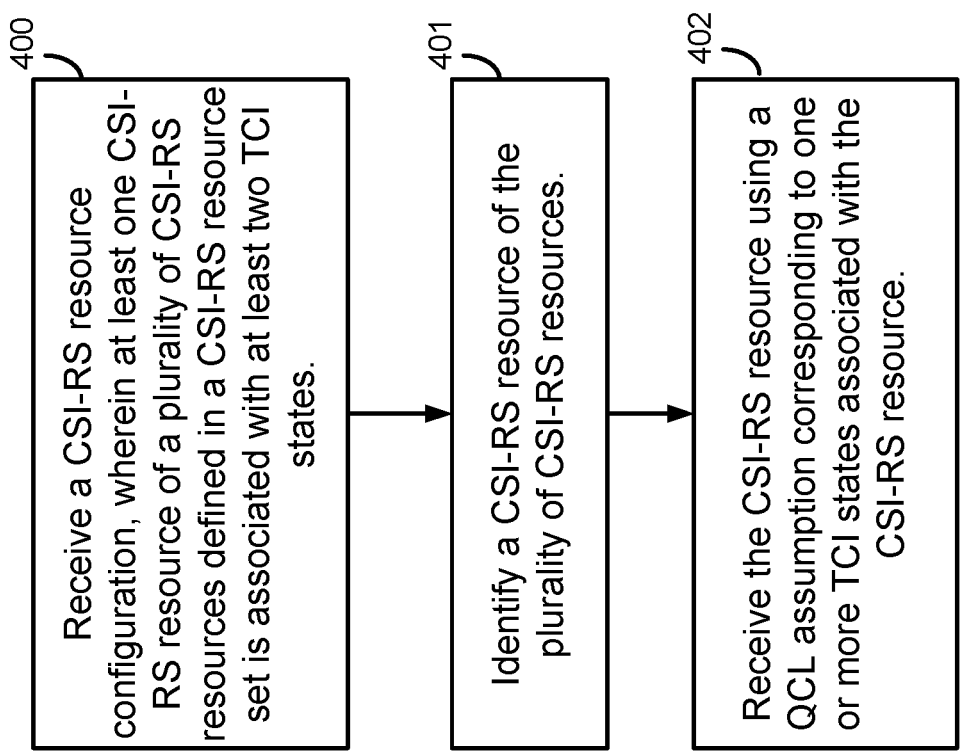
FIG. 4 is a block diagram illustrating example blocks executed to implement one aspect of the present disclosure.
Figure 8:
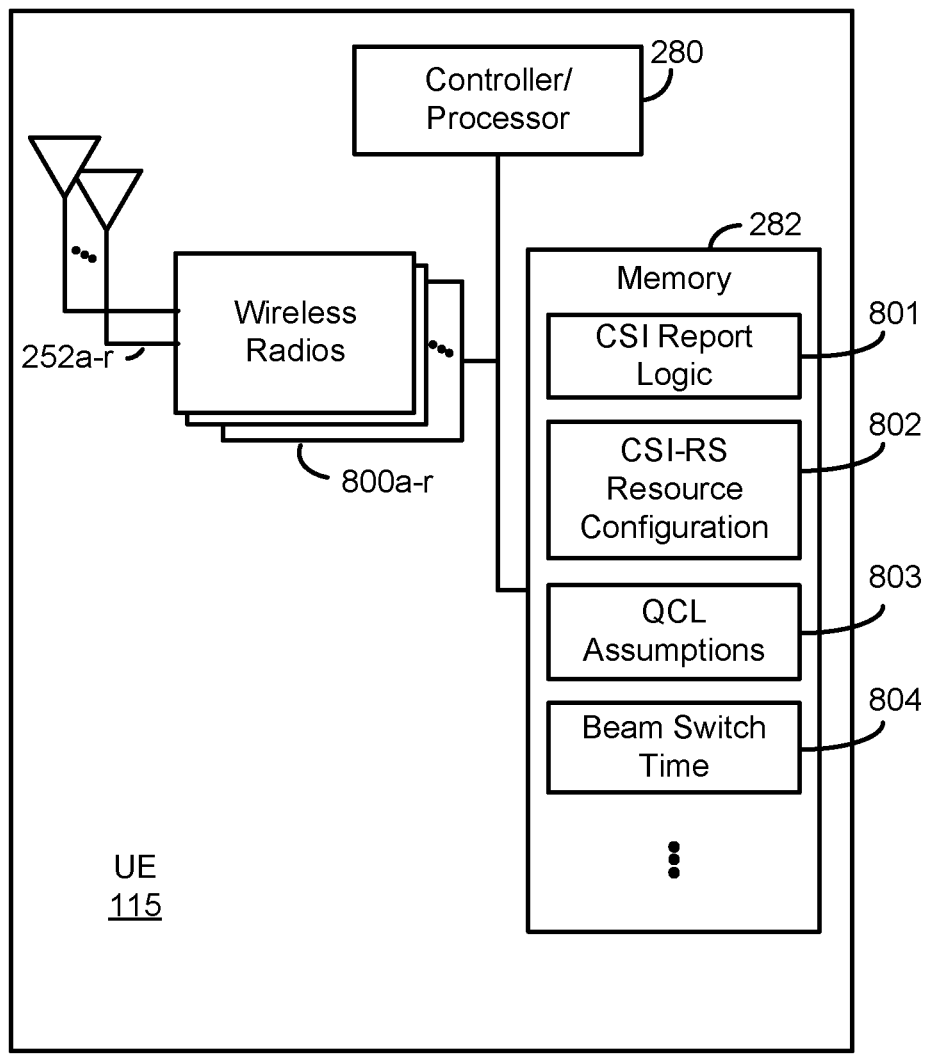
FIG. 8 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIGS. 2 and 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a UE receives a CSI-RS resource configuration, wherein at least one CSI-RS resource of a plurality of CSI-RS resources defined in a CSI-RS resource set is associated with at least two TCI states. A UE, such as UE 115, includes CSI report logic 801, stored in memory 282. Under control of controller/processor 280, UE 115 executes the instructions and code of CSI report logic 801. The processes and functionality provided by the executing instructions and code (referred to the "execution environment") of CSI report logic 801 enables UE 115 to recognize and react to the CSI-RS resource configuration signaling received via antennas 252*a-r* and wireless radios 800*a-r*. Within the execution environment CSI report logic 801, UE 115 stores all CSI-RS resource configuration information, including the association of two TCI states with at least one CSI-RS resource of a configured CSI-RS resource set, in memory 282 at CSI-RS resource configuration 802.

At block 401, the UE identifies a CSI-RS resource of the plurality of CSI-RS resources. Within the execution environment of CSI report logic 801, UE 115 may identify a targeted CSI-RS resource, whether in a periodic CSI-RS resource configuration, a semi-persistent CSI-RS resource configuration, or in a triggering downlink control information (DCI) received for an aperiodic CSI-RS resource configuration. Using the resource configuration information, stored at CSI-RS resource configuration, UE 115 may use specific received information or signaling to identify a specific CSI-RS resource for the CSI report and determine the one or more TCI states associated with the specified CSI-RS resource.

At block 402, the UE receives the CSI-RS resource using a quasi-co-location (QCL) assumption corresponding to one or more TCI states associated with the CSI-RS resource. Within the execution environment of CSI report logic 801, UE 115 may use the one or more TCI states to determine associated QCL assumption(s) by accessing QCL assumption 803 in memory 282. UE 115 may then receive the CSI-RS resource using the determined QCL assumptions.

In a first example aspect of the present disclosure, for periodic CSI-RS, more than one TCI state can be directly configured as part of a NZP-CSI-RS resource configuration. For example, with reference to FIG. 3A, according to the presently described aspect, NZP CSI-RS resource configuration 300, instead of providing for only a single TCI state ID associated with each periodic CSI-RS resource of the CSI-RS resource set configured in NZP CSI-RS resource configuration 300, at least one such periodic CSI-RS resource may be associated with two or more TCI state IDs. These multiple TCI states IDs associated with a single periodic CSI-RS resource may be included in a vector parameter within NZP CSI-RS resource configuration 300, which explicitly sets out the two or more TCI state IDs associated with the corresponding periodic CSI-RS resource.

Figure 5A:
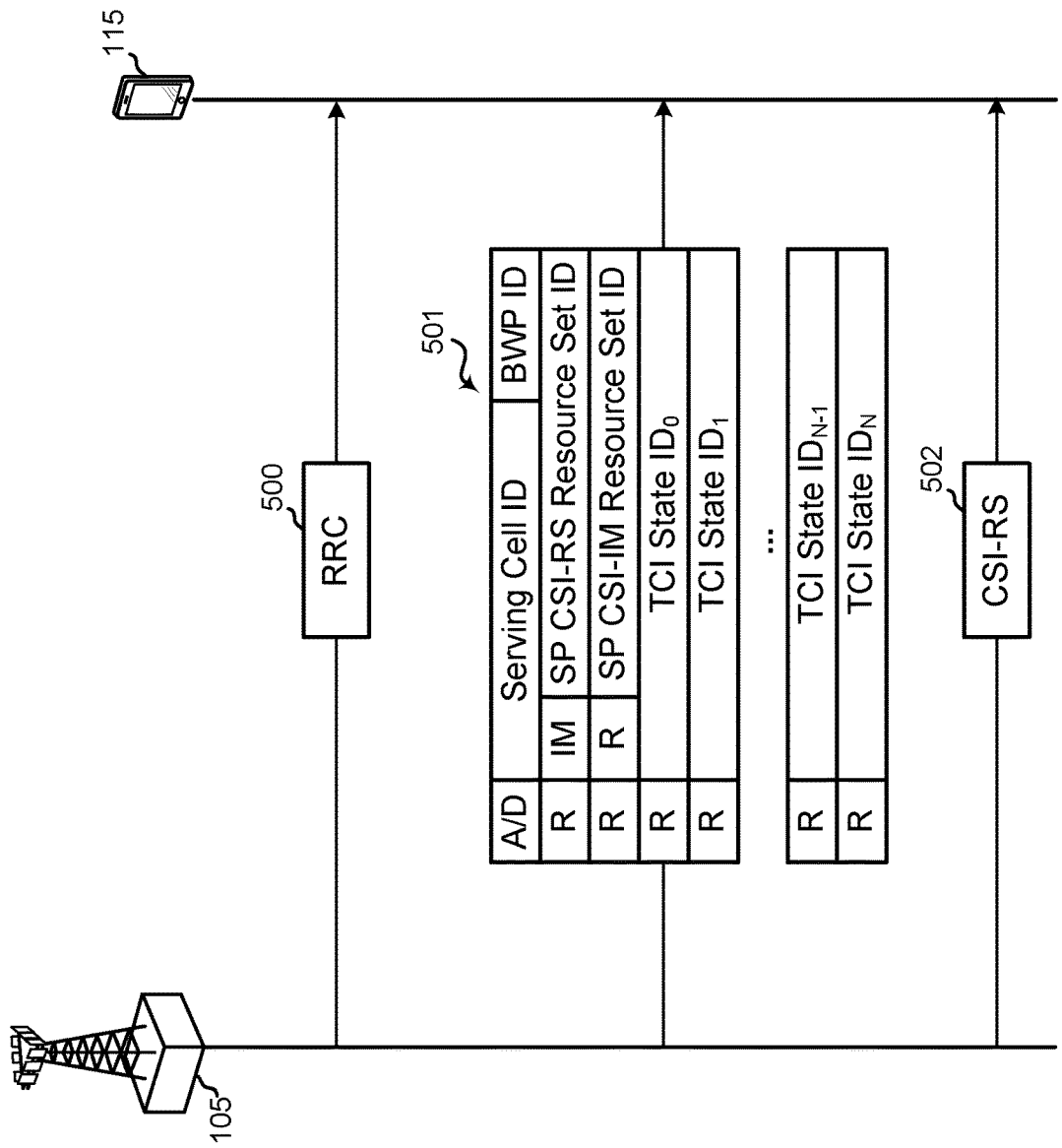
FIGS. 5A-5B are block diagrams illustrating the configuration of semi-persistent CSI-RS resources between a base station and UE according to aspects of the present disclosure.

FIG. 5A is a block diagram illustrating the configuration of semi-persistent CSI-RS resources between base station 105 and UE 115 according to one aspect of the present disclosure. In a second example aspect of the present disclosure, the association of a semi-persistent CSI-RS resource with a single TCI state or two or more TCI states can be determined, for example, as part of the semi-persistent CSI-RS resource configuration in RRC signaling 500. This semi-persistent CSI-RS resource configuration in RRC signaling 500 is separate from the trigger state configuration referenced in RRC signaling 302 (FIG. 3C) for aperiodic CSI-RS resource configuration. The semi-persistent CSI-RS resource configuration of RRC signaling 500 provides the details of each semi-persistent CSI-RS resource of the resource set, including an indication of a number of TCI states associated with each CSI-RS resource of the CSI-RS resources of the related resource set. Semi-persistent CSI-RS resource set activation may be accomplished by MAC-CE 501. MAC-CE 501 can indicate more than one TCI state ID for the one or more CSI-RS resources in the resource set. In such case, UE 115 may determine the mapping between the TCI states in MAC-CE 501 and the semi-persistent CSI-RS resources in the resource set based on the number of TCI states associated with each semi-persistent CSI-RS resource configured in the semi-persistent CSI-RS resource configuration of RRC signaling 500.

Figure 5B:
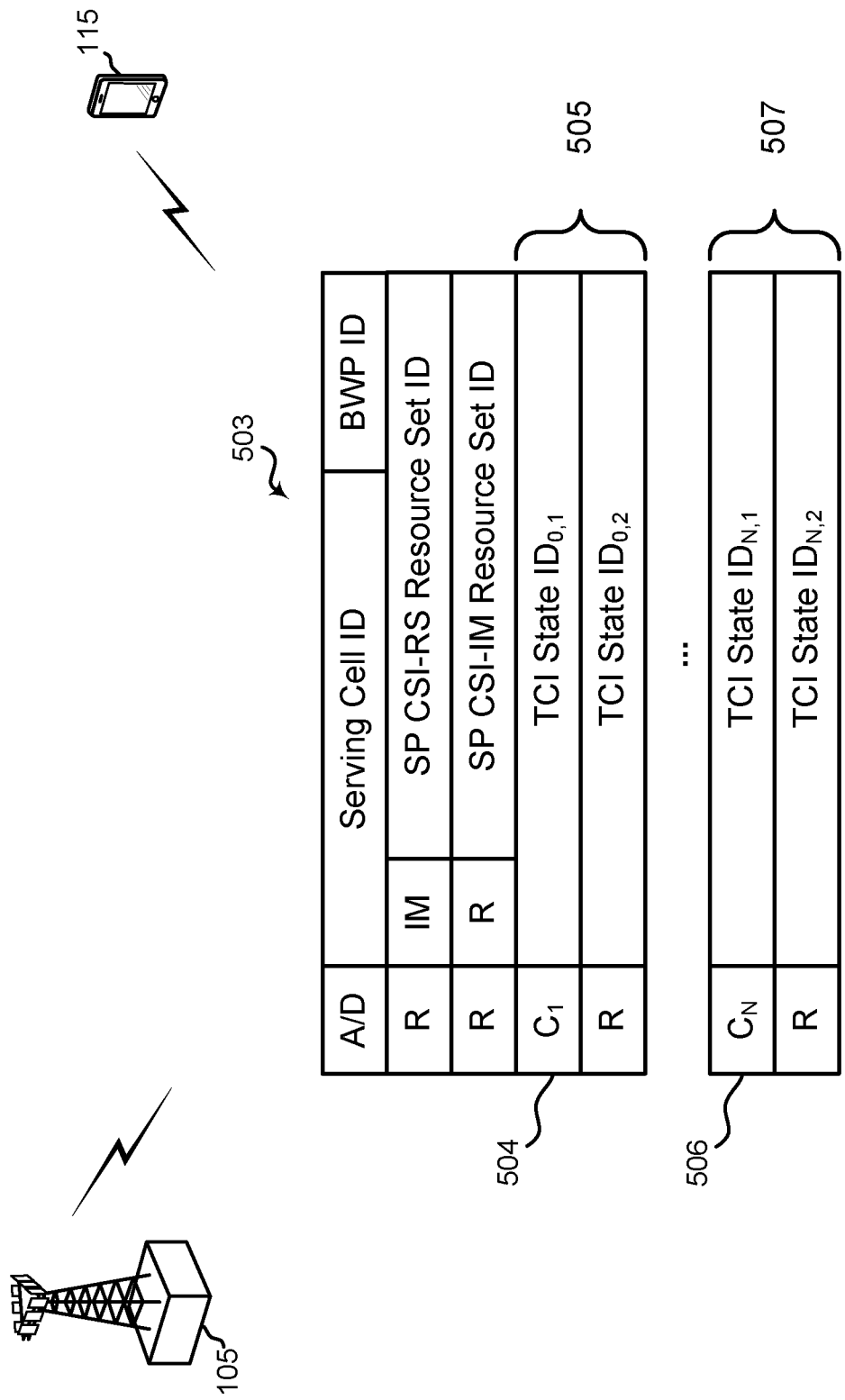

FIG. 5B is a block diagram illustrating an alternative configuration of semi-persistent CSI-RS resources between base station 105 and UE 115 according to one aspect of the present disclosure. In the illustrated alternative example of semi-persistent CSI-RS resource configuration, UE 115 may determine whether a semi-persistent CSI-RS resource is associated with one or more TCI states through an additional entry field of MAC-CE 503. As with MAC-CE 301 (FIG. 3B), MAC-CE 501 activates a specific CSI-RS resource set and configures the TCI state IDs associated with each semi-persistent CSI-RS resource of the resource set. However, with MAC-CE 501, the TCI state configuration includes identification of two or more TCI state IDs with one CSI-RS resource. This multiple association occurs with a new indicator field in MAC-CE 503. Multiple association indicator field 504 indicates to UE 115 that the TCI state entry after TCI state $ID_{0,1}$, namely, TCI state $ID_{0,2}$, each are associated with the same semi-persistent CSI-RS resource. Therefore, with multiple association indicator field 504 activated, UE 115 knows that TCI association 505, associates TCI state $ID_{0,1}$ and TCI state $ID_{0,2}$ with the same semi-persistent CSI-RS resource. Similarly, multiple association indicator field 506 indicates to UE 115 that TCI association 507, associates TCI state $ID_{N,1}$ and TCI state $ID_{N,2}$ with the same different CSI-RS-resource of the resource set.

Another example aspect of the present disclosure for aperiodic CSI-RS resource configuration may also be illustrated by the block diagram of FIG. 3C. According to the illustrated aspect, configuration of aperiodic CSI-RS resources may include configuration of an associated report setting for a trigger state that can indicate more than one TCI state associated with a CSI-RS resource in the CSI-RS resource set. In a first alternative implementation of the present aspect, the association of the aperiodic CSI-RS resource of the resource set with a single TCI state or two or more TCI states may by indicated in an aperiodic CSI-RS resource configuration in RRC signaling 302. Similarly to the aspect associated with semi-persistent CSI-RS resource configuration in FIG. 5A, this aperiodic CSI-RS resource configuration in RRC signaling 302 is separate from the trigger state configuration. The aperiodic CSI-RS resource configuration in RRC signaling 302 also includes indication of a number of TCI states associated with each CSI-RS resource along with a sequence of TCI state IDs associated with each CSI-RS resource of the CSI-RS resources of the related resource set. The activation of trigger states by MAC-CE 303 would map to a maximum number of TCI codepoints. For example, a sequence of TCI state IDs, configured as part of the associated report setting in the aperiodic CSI-RS resource configuration, can have more TCI state IDs than the number of CSI-RS resources in the CSI-RS resource set. DCI 304 provides UE 115 the trigger state which allows UE 115 to determine the mapping between the TCI states in the sequence and the aperiodic CSI-RS resources in the resource set based on whether each CSI-RS resource is associated with a single TCI state or two or more TCI states.

In an alternative aspect of aperiodic CSI-RS resource configuration, also illustrated in FIG. 3C, base station 105 provides the trigger state configuration at RRC signaling 302 as part of the associated report setting configured for the aperiodic trigger state. The trigger state configuration of RRC signaling 302 can configure up to a maximum number of trigger states, in which each trigger state may be linked to one or more report settings, which may themselves be linked through a CSI report configuration ID, in which one aperiodic CSI-RS resource set may be configured. Each such CSI-RS resource set may include multiple CSI-RS resources, and the TCI state for each of these CSI-RS resources may be indicated as part of the trigger state configuration.

MAC-CE 303 activates the trigger states to map up to a maximum number of TCI codepoints. In such example aspect, the resulting trigger state configuration includes the trigger states for each of the TCI codepoints that includes an explicit identification of whether a given aperiodic CSI-RS resource is associated with a single TCI state ID or two or more TCI state IDs. For example, in each trigger state associated with a particular CSI request field value, a sequence of TCI state IDs is identified for a corresponding CSI-RS resource. An example trigger state corresponding to a CSI request field value includes the sequence, {(TCI state 1, TCI state 2), (TCI state 3), (TCI state 4), (TCI state 5, TCI state 6), . . . } for the CSI-RS resources in the resource set. UE 115 reads this sequence to mean that the first aperiodic CSI-RS resource of the resource set is associated with two TCI state IDs (TCI state 1, TCI state 2), the second aperiodic CSI-RS resource is associated with a single TCI state ID (TCI state 3), and so on. Thus, the mapping between the sequence of TCI states and CSI-RS resources in the set is explicitly be given in the configuration trigger states.

As indicated above, when UE 115 determines the TCI state ID or the two or more TCI state IDs associated with the particular aperiodic CSI-RS resource, it would then determine the QCL assumption associated with the identified TCI state ID. UE 115 would then apply the determined QCL assumption in receiving and decoding the aperiodic CSI-RS resource. However, additional considerations are made when determining the associated QCL assumption for a given aperiodic CSI-RS resource.

The determination of this QCL assumption may be determined based on a relationship between a scheduling offset, which is defined as the period between the last symbol of the downlink signaling carrying the triggering DCI and the first symbol of the aperiodic CSI-RS resources, and a threshold beam switch time reported by UE 115. As defined in the current standards, where an aperiodic CSI-RS resource is associated with a single TCI state ID, a UE may report a threshold beam switch time that is one of the set {14, 28, 48} or one of the set {224, 336}. The QCL assumption that should be applied by UE 115 to receive the aperiodic CSI-RS resource may depend on whether the scheduling offset is greater than or equal to or less than a threshold value associated with the reported threshold beam switch time. For example, the threshold value may be one of the reported threshold beam switch times of the set {14, 28, 48} or may be a different threshold (e.g., 36, 48, 54) when the reported threshold beam switch time is one of the set {224, 336}. When the scheduling offset is greater than or equal to the threshold value, then the QCL assumption is determined to be the QCL assumption associated with the TCI state identified in the aperiodic CSI-RS resource configuration. However, when the scheduling offset is less than a predetermined threshold value, a different QCL assumption or assumptions may be applied for the aperiodic CSI-RS resources.

In implementations of the current standards with a single TCI state ID associated with each aperiodic CSI-RS resource, when the scheduling offset is less than the threshold value related to the reported threshold beam switch time, and there is any other downlink signal with an indicated TCI state in the same symbols as the aperiodic CSI-RS resource, the UE may apply the QCL assumption of the other downlink signal when receiving the aperiodic CSI-RS resource. The other downlink signal may refer to a shared channel downlink transmission (e.g., PDSCH) scheduled with a scheduling offset greater than or equal to the threshold standard time duration for a QCL, or an aperiodic CSI-RS resource scheduled with a scheduling offset greater than or equal to the threshold value related to the reported threshold beam switch time, or for periodic or semi-persistent CSI-RS resources. Otherwise, if there are no other downlink signals in the same symbols as the aperiodic CSI-RS with the scheduled offset less than the threshold value, when the UE receives this aperiodic CSI-RS resource, the UE may apply a default QCL assumption that is defined for and used for a control resource set (CORESET) associated with a monitored search space. However, the default QCL assumption used would correspond to the CORESET with the lowest CORESET ID in the latest slot in which one or more CORESETs within the active bandwidth part (BWP) of the serving cell are monitored by the UE.

In Rel. 15, a set of up to eight TCI states can be activated for a downlink shared channel transmission. The TCI field in the downlink DCI may indicate the TCI state ID for the scheduled downlink transmission if the time offset between the reception of the downlink DCI and the corresponding downlink transmission is equal to or greater than the threshold time duration for a QCL assumption. This time duration for a QCL assumption may correspond to a reported UE capability (e.g., 14 or 28 OFDM symbols). However, if the time offset is less than this reported UE capability time duration for a QCL assumption, then a default QCL assumption is used. The default QCL assumption for a downlink transmission may correspond to the TCI state of the CORESET associated with a monitored search space with the lowest CORESET ID in the latest slot in which one or more CORESETs within the active BWP of the serving cell are monitored by the UE.

If all of the TCI code points are mapped to a single TCI state and the offset between the reception of the downlink DCI and the corresponding downlink transmission is less than the threshold time duration for a QCL assumption, the UE may assume that the demodulation reference signal (DMRS) ports of the downlink transmission of a serving base station or cell are QCL with the reference signal(s) with respect to the large-scale QCL parameters used for the downlink control transmission of the QCL indication of the CORESET associated with a monitored search space with the lowest CORESET ID in the latest slot in which one or more CORESETs within the active BWP of the serving cell are monitored by the UE.

In a multiple DCI-based design having multi-TRP transmissions, a first DCI may be transmitted from a first TRP which schedules a first downlink transmission from the first TRP, and a second DCI transmitted from a second TRP which schedules a second downlink transmission from the second TRP. The TRPs may be differentiated at the UE based on a CORESET pool index. Each of a maximum of five CORESETs can be configured with one value of a CORESET pool index, which can be 0 or 1. This pools the CORESETs in to two groups. Other than the difference in CORESET pool index, the different TRPs would be transparent to the UE. The CORESET pool index of the CORESET in which a DCI is received is used for different purposes, such as a hybrid automatic receipt request (HARM) acknowledgement codebook construction and transmission, downlink shared channel scrambling, and the like. It may also be used for the default QCL assumption rule, where the UE maintains two default QCL assumptions corresponding to the lowest CORESET ID within each CORESET group defined by the CORESET pool index.

When a UE configured by higher layer parameters contains two different values of the CORESET pool index within the CORESET configuration fields, if the offset between the reception of the downlink DCI and the corresponding downlink transmission is less than the threshold time duration for a QCL assumption, the UE may assume that the DMRS ports of the downlink transmission associated with a value of one CORESET pool index of a serving base station or cell are QCL with the reference signals with respect to the QCL parameters used for control signal QCL of the CORESET associated with a monitored search space with the lowest CORESET ID among CORESETs, which are configured with the same CORESET pool index as the scheduling of the downlink transmission in the latest slot as the scheduling of the downlink transmission within the active BWP of the serving cell are monitored by the UE.

In 3GPP Release 16 (Rel. 16), each TCI codepoint in the DCI corresponding to a TCI field value in the DCI can indicate one or more TCI states for the downlink transmission. This has been discussed for a single-DCI based mTRP, where a scheduled downlink transmission can have two TCI states corresponding to the two TRPs. In this case, if at least one TCI codepoint indicates two TCI states, a default QCL assumption for the downlink transmission may be the TCI states corresponding to the lowest code point among the TCI code points containing two different TCI states. The lowest CORESET ID is no longer used for the default QCL assumption for the downlink transmission in such case.

If the offset between the reception of the downlink DCI and the corresponding downlink transmission is less than the threshold time duration for a QCL assumption, and at least one configured TCI state for the serving base station of the scheduled downlink transmission contains an associated QCL type indicator, and at least one TCI codepoint indicates two TCI states, the UE may assume that the DMRS ports of the downlink transmission of a serving cell are QCL with the reference signals with respect to the QCL parameters associated with the TCI states corresponding to the lowest code point among the TCI code points containing two different TCI states.

Additional aspects of the present disclosure provide, if any trigger state that is mapped to a CSI request field codepoint that corresponds to a CSI-RS resource set in which one or more CSI-RS resources are associated with two TCI states, and if the scheduling offset is less than the threshold value related to the UE-reported threshold beam switch timing, the QCL assumptions of the aperiodic CSI-RS resources may be associated with multiple TCI states.

Figure 6:
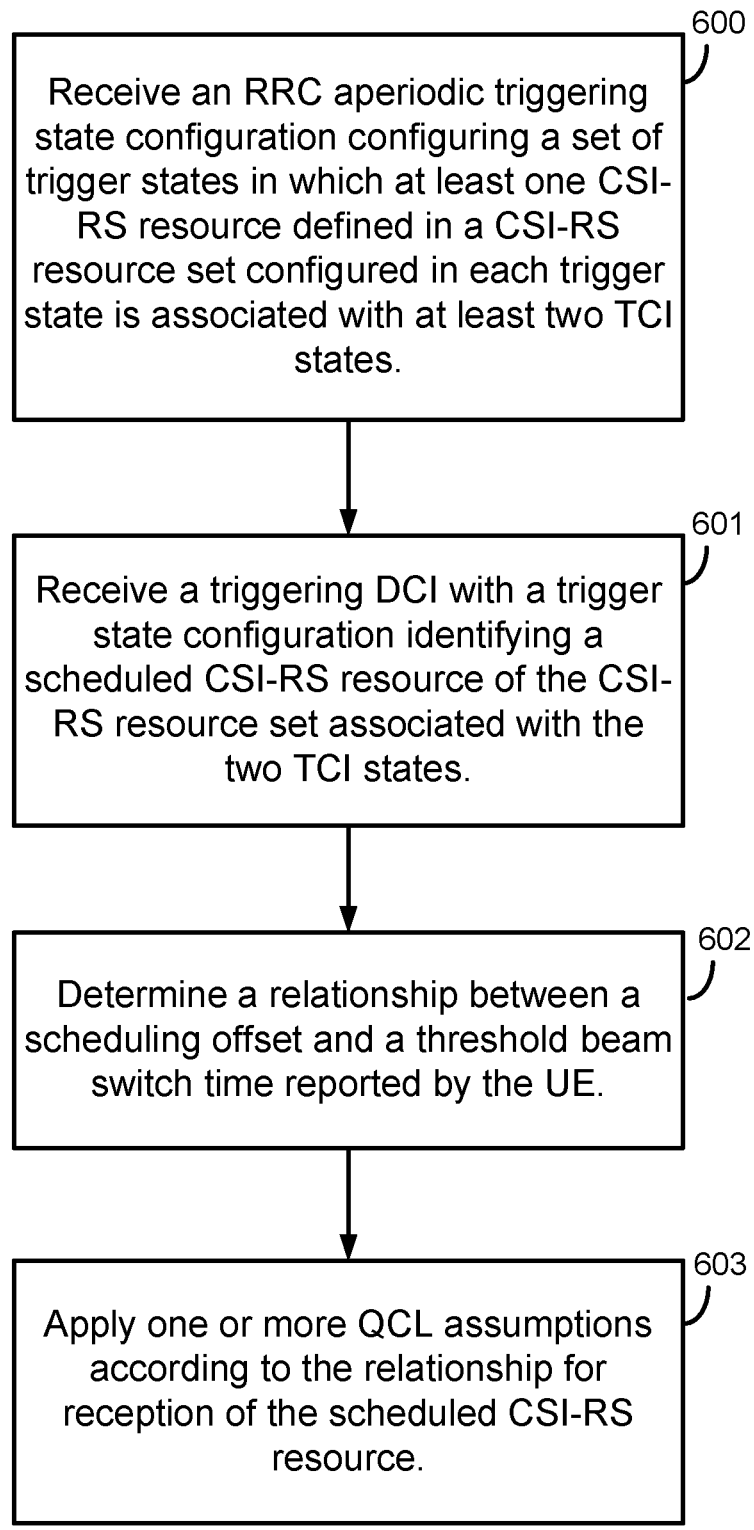
FIG. 6 is a block diagram illustrating example blocks executed to implement one aspect of the present disclosure.

FIG. 6 is a block diagram illustrating example blocks executed to implement one aspect of the present disclosure. The example blocks will also be described with respect to UE 115 as illustrated in FIGS. 2 and 8.

At block 600, a UE receives an RRC message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states. A UE, such as UE 115, includes CSI report logic 801, stored in memory 282. Under control of controller/processor 280, UE 115 executes the instructions and code of CSI report logic 801. Within the execution environment CSI report logic 801, UE 115 stores all aperiodic triggering state configuration information configuring the set of trigger states, including the association of two TCI states with at least one CSI-RS resource of a configured CSI-RS resource set, in memory 282 at CSI-RS resource configuration 802.

At block 601, the UE receives a triggering DCI identifying the trigger state that identifies at least one CSI-RS resource of the CSI-RS resource set associated with the at least two TCI states. Within the execution environment of CSI report logic 801, UE 115 may identifies a triggering DCI received via antennas 252a-r and wireless radios 800a-r for an aperiodic CSI-RS resource configuration. Using the resource configuration information, stored at CSI-RS resource configuration, UE 115 may use specific received trigger state to identify a specific CSI-RS resource for the CSI report and determine the one or more TCI states associated with the specified CSI-RS resource.

At block 602, the UE determines a relationship between a scheduling offset and a threshold beam switch time reported by the UE. Prior to applying a QCL assumption associated with the one or more TCI states, UE 115, within the execution environment of CSI report logic 801, determines whether the scheduling offset is at least as large as or less than the threshold beam switch timing, stored in memory 282 at beam switch time 804. The scheduling offset is measured as the last symbol of the downlink control signal carrying the triggering DCI and the first symbol of the specified CSI-RS resource. UE 115 reports this threshold beam switch time to determine whether the associated QCL assumption may, in fact, be applied to receipt of the identified CSI-RS resource.

At block 603, the UE applies one or more QCL assumptions according to the relationship for reception of the CSI-RS resource. If the scheduling offset is greater than or equal to the reported beam switch time, then, within the execution environment of CSI report logic 801, UE 115 will apply the QCL assumption(s) associated with the one or more TCI states associated with the specified aperiodic CSI-RS resource. Otherwise, if the scheduling offset is less than the reported beam switch time then, also within the execution environment of CSI report 801, UE 115 will determine a different QCL assumption to apply, whether that QCL assumption is associated with another downlink signal within the same symbols as the specified aperiodic CSI-RS resource or it is a default QCL assumption associated with a configured control resource set (CORESET), as indicated in greater detail below.

Figure 7A:
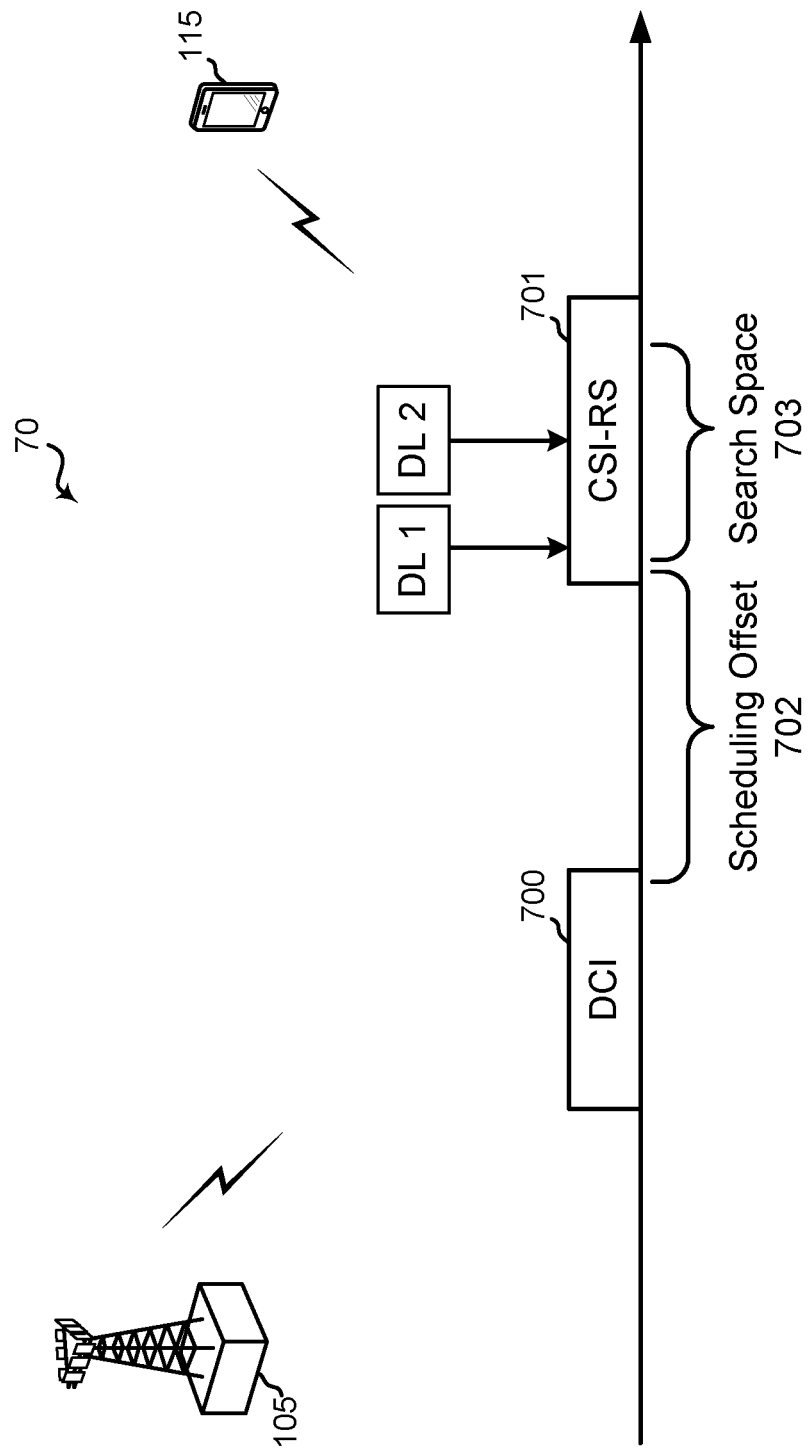
FIGS. 7A-7B are block diagrams illustrating a portion of 5G NR network having a base station and UE configured according to aspects of the present disclosure.

FIG. 7A is a block diagram illustrating a portion of 5G NR network 70 having base station 105 and UE 115 configured according to one aspect of the present disclosure. Within the configuration of aperiodic CSI-RS resources, in which at least one aperiodic CSI-RS resource of a configured resource set is associated with two or more TCI states, a triggering DCI, DCI 700, transmitted by base station 105 is received by UE 115. The selected trigger state configuration identifies aperiodic CSI-RS resource 701 associated with two or more TCI state IDs. UE 115 determines a relationship between scheduling offset 702, as defined above, and a threshold value related to a threshold beam switch time reported by UE 115. The determined relationship indicates that scheduling offset 702 is less than the threshold value. Instead of applying the QCL assumptions associated with the two or more TCI state IDs, UE 115 makes a different determination of QCL assumption to apply.

UE 115 detects downlink transmissions, DL 1 and DL 2, within the same symbols as aperiodic CSI-RS resource 701. In a first example implementation, UE 115 determines that DL 1 is associated with multiple TCI states and, in the scenario where DL 1 is a scheduled downlink transmission (e.g., scheduled PDSCH)) or another aperiodic CSI-RS, the offset of DL 1 is greater than or equal to the QCL assumption time for DL 1. With these determinations, UE 115 would then apply the QCL assumptions of DL 1 in receiving aperiodic CSI-RS resource 701. In a second example implementation, UE 115 determines that DL 1 is associated with a first TCI state, while DL 2 is associated with a second TCI state. Both offsets for DL 1 and DL 2 also are greater than or equal to the QCL assumption time. Thus, UE 115 applies the QCL assumption associated with the first TCI state of DL 1 and the QCL assumption associated with the second TCI state of DL 2 to receive and decode aperiodic CSI-RS resource 701.

It should be noted that DL 1 and DL 2 may include other types of downlink signals, such as downlink shared channel (e.g., PDSCH) or another multi-TCI state CSI-RS resource, whether aperiodic, semi-persistent, or periodic.

In another example aspect of the present disclosure, UE 115 determines that both DL 1 and DL 2 are associated with the same TCI state. In such case, UE 115 may apply the QCL assumption of DL 1 and DL 2, based on the single TCI state, for reception and decoding aperiodic CSI-RS resource 701 for only one of the port groups of aperiodic CSI-RS resource 701. UE 115 may determine a default QCL assumption to apply to the other port group of aperiodic CSI-RS resource 701, where the default QCL assumption is configured for the downlink shared channel.

As described above, the default QCL assumption configured for the downlink shared channel may be defined and used for a CORESET associated with a monitored search space 703. However, the default QCL assumption used would correspond to the CORESET with the lowest CORESET ID in the latest slot in which one or more CORESETs within the active bandwidth part (BWP) of the serving cell are monitored by UE 115.

It should be noted that, should UE 115 determine that DL 1 and DL 2 are not, in fact, within the symbols of aperiodic CSI-RS resource 701, UE 115 may use two default QCL assumptions of the downlink shared channel, as indicated, for reception and decoding of aperiodic CSI-RS resource 701.

Figure 7B:
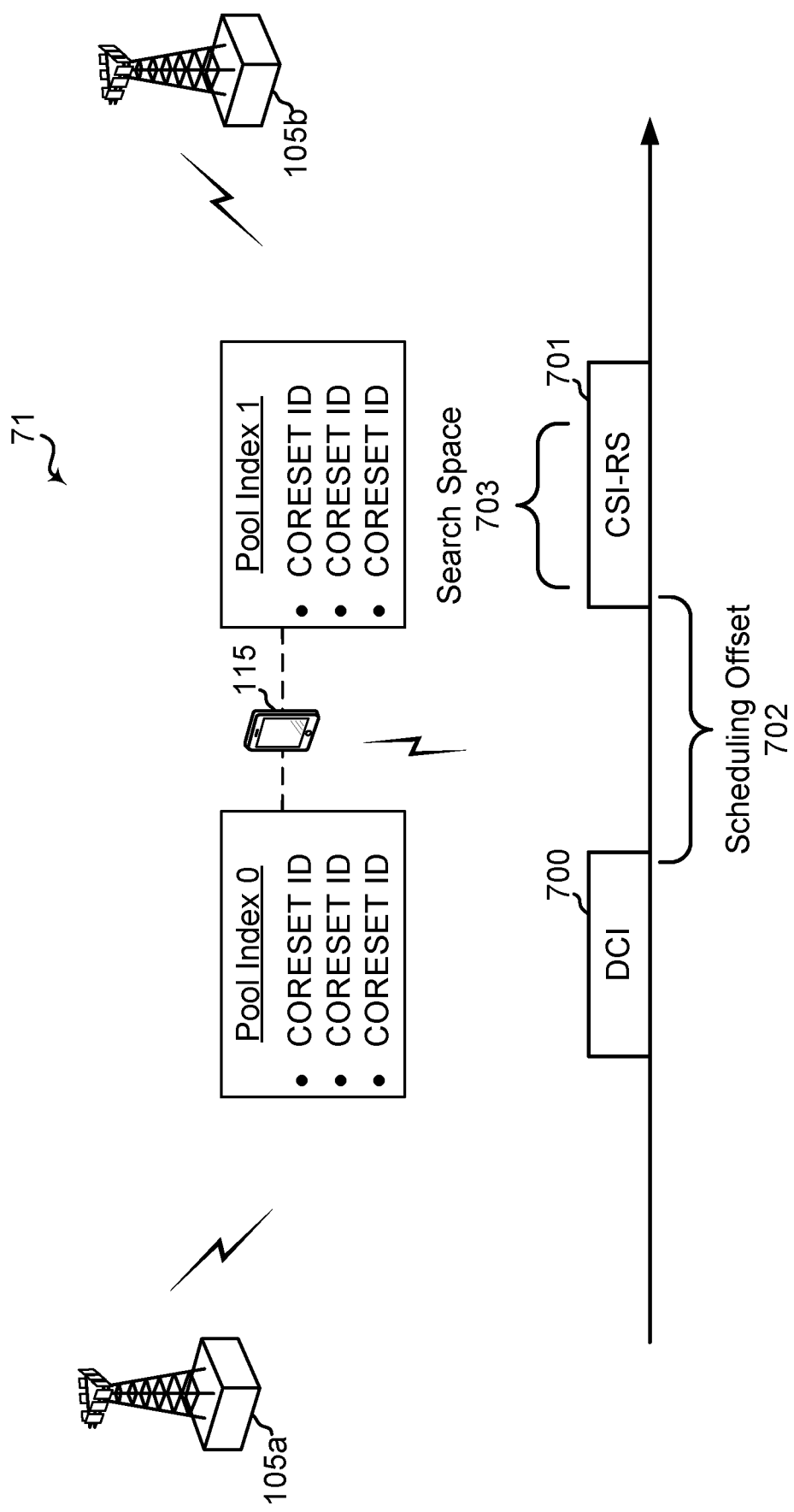

FIG. 7B is a block diagram illustrating a portion of 5G NR network 71 having base stations 105*a*-105*b* and UE 115 configured according to one aspect of the present disclosure. Within the configuration of aperiodic CSI-RS resources, in which at least one aperiodic CSI-RS resource of a configured resource set is associated with two or more TCI states, a triggering DCI, DCI 700, transmitted by one or both of base stations 105*a* and 105*b* is received by UE 115. The selected trigger state configuration identifies aperiodic CSI-RS resource 701 associated with two or more TCI state IDs. UE 115 determines a relationship between scheduling offset 702, as defined above, and a threshold value related to a threshold beam switch time reported by UE 115. The determined relationship indicates that scheduling offset 702 is less than the threshold value. Instead of applying the QCL assumptions associated with the two or more TCI state IDs, UE 115 makes a different determination of QCL assumption to apply.

Where at least one TCI codepoint indicates two TCI states associated with aperiodic CSI-RS resource 701, two default QCL assumptions may be based on the TCI states corresponding to the lowest code point among the TCI code points containing two different TCI states. As illustrated, UE 115 is configured by higher layer parameters to contain two different values of the CORESET pool index within the CORESET configuration field. Thus, there may be two default QCL assumptions across pool index 0 and pool index 1. In a first default QCL assumption, the QCL assumption corresponds to the CORESET with the lowest CORESET ID among the CORESETs configured with pool index 0 that is monitored by UE 115 in the latest slot. The second default QCL assumption corresponds to the CORESET with the lowest CORESET ID among the CORESETs configured with pool index 1 monitored by UE 115 in the latest slot. Thus, UE 115 applies a first QCL assumption to the first port group of aperiodic CSI-RS resource 701 from a CORESET ID of pool index 0 and a second QCL assumption to the second port group of aperiodic CSI-RS resource 701 from a CORESET ID of pool index 1. UE 115 uses the two QCL assumptions to receive and decode aperiodic CSI-RS resource 701

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication receiving, by a UE, a CSI-RS resource configuration, wherein at least one CSI-RS resource of a plurality of CSI-RS resources defined in a CSI-RS resource set is associated with at least two TCI states, identifying, by the UE, a CSI-RS resource of the plurality of CSI-RS resources, and receiving, by the UE, the CSI-RS resource using a QCL assumption corresponding to one or more TCI states associated with the CSI-RS resource.

A second aspect, based on the first aspect, wherein the receiving the CSI-RS resource configuration includes receiving an RRC message for periodic CSI-RS resource configuration including a maximum number of TCI states per resource configured to the at least two TCI states.

A third aspect, based on the first aspect, wherein the receiving the CSI-RS resource configuration includes receiving ab RRC message for semi-persistent CSI-RS resource configuration configuring a number of TCI states associated with each CSI-RS resource of the plurality of CSI-RS resources of the CSI-RS resource set in an associated CSI report configuration for an aperiodic CSI trigger state, including the at least two TCI states associated with the at least one CSI-RS resource, and wherein the identifying the CSI-RS resource includes receiving a MAC-CE including one or more identified TCI states; and mapping the one or more identified TCI states to the CSI-RS resource using the number of TCI states associated with each CSI-RS resource in the RRC message for semi-persistent CSI-RS resource configuration.

A fourth aspect, based on the first aspect, wherein the receiving the CSI-RS resource configuration includes receiving a MAC-CE, wherein the MAC-CE includes identification of the CSI-RS resource set and a plurality of TCI states associated with the plurality of CSI-RS resources defined in the CSI-RS resource set, identifying an indicator within the MAC-CE that indicates two or more TCI states of the plurality of TCI states are associated with a single CSI-RS resource.

A fifth aspect, based on the first aspect, wherein the receiving the CSI-RS resource configuration includes receiving an RRC message for an aperiodic CSI-RS resource configuration including a plurality of CSI trigger states, wherein each CSI trigger state of the plurality of CSI trigger states defines one or more CSI report configurations, and wherein each CSI report configuration of the one or more CSI report configurations defines a corresponding CSI-RS resource set including one or more corresponding CSI-RS resources, and receiving a MAC-CE that activates a subset of activated CSI trigger states of the plurality of triggers states for aperiodic CSI-RS reporting.

A sixth aspect, based on the fifth aspect, wherein the RRC message for the aperiodic CSI-RS resource configuration includes a number of TCI states associated with each CSI-RS resource of the plurality of CSI-RS resources of the CSI-RS resource set in an associated CSI report configuration for an aperiodic CSI trigger state, and a sequence of TCI state IDs at least one TCI state associated with each CSI-RS resource of the plurality of CSI-RS resources of the CSI-RS resource set, including the at least one CSI-RS resource associated with the at least two TCI states, and wherein the identifying the CSI-RS resource includes receiving a DCI identifying an aperiodic CSI trigger state of the subset of activated CSI trigger states, wherein the aperiodic CSI trigger state is associated with the associated CSI report configuration, and mapping the CSI-RS resource to the one or more TCI states associated with the CSI-RS resource using the RRC message for aperiodic CSI-RS resource configuration.

A seventh aspect, based on the fifth aspect, wherein each CSI report configuration of the one or more CSI report configurations includes a sequence of TCI state IDs, wherein each entry in the sequence of TCI state IDs explicitly references the one or more TCI states associated with each CSI-RS resource of the plurality of CSI-RS resources in the CSI-RS resource set corresponding to the each CSI report configuration, and wherein the identifying the CSI-RS resource includes receiving a DCI including an identification of a scheduled trigger state in the subset of activated trigger states corresponding to the CSI-RS resource of the plurality of CSI-RS resources, and mapping the CSI-RS resource to the one or more TCI states associated with the CSI-RS resource using the sequence of TCI state IDs of a CSI report configuration associated with the scheduled trigger state.

An eighth aspect that includes any combination of the first through the seventh aspects.

A ninth aspect configured for wireless communication includes receiving, by a UE, an RRC message for aperiodic triggering state configuration configuring a set of trigger states, in which at least one CSI-RS resource of a plurality of CSI-RS resources is associated with at least two TCI states, wherein the plurality of CSI-RS resources is defined in a CSI-RS resource set configured in an associated CSI report configuration with a trigger state of the set of trigger states, receiving, by the UE, a triggering DCI identifying the trigger state that identifies at least one CSI-RS resource of the CSI-RS resource set associated with the at least two TCI states, determining, by the UE, a relationship between a scheduling offset and a threshold beam switch time reported by the UE, and applying, by the UE, one or more QCL assumptions according to the relationship for reception of the CSI-RS resource.

A tenth aspect, based on the ninth aspect, wherein the applying the one or more QCL assumptions includes applying the one or more QCL assumptions associated with the at least two TCI states when the relationship includes the scheduling offset being greater than or equal to a threshold value associated with the threshold beam switch time.

An eleventh aspect, based on the ninth aspect, wherein the applying the one or more QCL assumptions includes applying two or more QCL assumptions for the reception of the CSI-RS resource when the relationship includes the scheduling offset being less than a threshold value associated with the threshold beam switch time.

A twelfth aspect, based on the eleventh aspect, wherein the applying the two or more additional QCL assumptions includes identifying at least one downlink transmission within a same set of symbols as the CSI-RS resource, and determining that the at least one downlink transmission is associated with at least two downlink TCI states, wherein the two or more QCL assumptions are associated with the at least two downlink TCI states.

A thirteenth aspect, based on the eleventh aspect, wherein the applying the two or more QCL assumptions includes identifying two or more downlink transmissions within a same set of symbols as the CSI-RS resource, and determining that each downlink transmission of the two or more downlink transmissions is associated with a single TCI state that is different from the single TCI state associated with another downlink transmission of the two or more downlink transmissions, wherein the two or more QCL assumptions are associated with the single TCI state of the two or more downlink transmissions.

A fourteenth aspect, based on the eleventh aspect, wherein the applying the two or more QCL assumptions includes identifying two or more downlink transmissions within a same set of symbols as the CSI-RS resource, wherein the two or more downlink transmissions are associated with a same TCI state, determining a first QCL assumption of the two or more QCL assumptions for application to a first port group of the CSI-RS resource, wherein the first QCL assumption is associated with the same TCI state, and determining one or more default QCL assumptions of the two or more QCL assumptions for application to a second port group of the CSI-RS resource, wherein the one or more default QCL assumptions are associated with shared channel downlink transmissions.

A fifteenth aspect, based on the eleventh aspect, wherein the applying the two or more QCL assumptions includes failing to identify any additional downlink transmissions within a same set of symbols as the CSI-RS resource, and determining two or more default QCL assumptions applicable for the two or more QCL assumptions, wherein the two or more default QCL assumptions are associated with shared channel downlink transmissions.

A sixteenth aspect, based on the eleventh aspect, wherein the applying the two or more QCL assumptions includes applying one or more default QCL assumptions associated with shared channel downlink transmissions.

A seventeenth aspect, based on the sixteenth aspect, further including determining, by the UE, at least one TCI codepoint indicating two different TCI states, wherein two or more default QCL assumptions of the one or more default QCL assumptions is based on two or more TCI states corresponding to a lowest codepoint containing two diverse TCI states among all TCI codepoints.

An eighteenth aspect, based on the sixteenth aspect, further including receiving, by the UE, a COREST configuration including one or more CORESET IDs of a first CORESET pool index and one or more additional CORESET IDs of a second CORESET pool index, wherein a first default QCL assumption of the one or more QCL assumptions is based on a first lowest CORESET ID of the first CORESET pool index monitored by the UE in a first latest slot associated with the first CORESET pool index, and wherein a second default QCL assumption of the one or more QCL assumptions is based on a second lowest CORESET ID of the second CORESET pool index monitored by the UE in a second latest slot associated with the second CORESET pool index.

A nineteenth aspect including any combination of the ninth through the eighteenth aspects.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE), comprising:
    receiving a channel state information-reference signal (CSI-RS) resource configuration, wherein the CSI-RS resource configuration configures an association of at least one CSI-RS resource of a plurality of CSI-RS resources with at least two transmission configuration indicator (TCI) states;
    identifying a CSI-RS resource of the plurality of CSI-RS resources; and
    receiving the identified CSI-RS resource using a quasi-co-location (QCL) assumption corresponding to one or more TCI states associated with the identified CSI-RS resource.

2. The method of claim 1,
    wherein the CSI-RS resource configuration is received in a radio resource control (RRC) message for semi-persistent CSI-RS resource configuration,
    wherein the semi-persistent CSI-RS resource configuration configures a number of TCI states associated with each CSI-RS resource of the plurality of CSI-RS resources, and
    wherein the identifying the CSI-RS resource includes:
        receiving a medium access control-control element (MAC-CE) including one or more identified TCI states; and mapping the one or more identified TCI states to the CSI-RS resource using the number of TCI states associated with each CSI-RS resource in the RRC message for semi-persistent CSI-RS resource configuration.

3. The method of claim 1, wherein the CSI-RS resource configuration is received in a medium access control-control element (MAC-CE), wherein the MAC-CE includes an identification of a CSI-RS resource set and a plurality of TCI states associated with the plurality of CSI-RS resources defined in the CSI-RS resource set and an indication of the at least two TCI states from the plurality of TCI states that are associated with a single CSI-RS resource.

4. The method of claim 1,
wherein the CSI-RS resource configuration is received in a radio resource control (RRC) message for an aperiodic CSI-RS resource configuration,
wherein the RRC message includes a plurality of CSI trigger states,
wherein each CSI trigger state of the plurality of CSI trigger states defines one or more CSI report configurations, and
wherein each CSI report configuration of the one or more CSI report configurations defines a corresponding CSI-RS resource set including one or more corresponding CSI-RS resources, and
wherein the method further includes:
receiving a medium access control-control element (MAC-CE) that activates a subset of activated CSI trigger states of the plurality of triggers states for aperiodic CSI-RS reporting; and
transmitting a CSI report in response to the identified CSI-RS resource.

5. The method of claim 4,
wherein the RRC message for the aperiodic CSI-RS resource configuration further includes:
a number of TCI states associated with each CSI-RS resource of the plurality of CSI-RS resources in an associated CSI report configuration for an aperiodic CSI trigger state of the subset of activated CSI trigger states; and
a sequence of TCI state identifiers (IDs) identifying at least one TCI state associated with the each CSI-RS resource, including the at least one CSI-RS resource associated with the at least two TCI states; and
wherein the identifying the CSI-RS resource includes:
receiving a downlink control information (DCI) identifying the aperiodic CSI trigger state of the subset of activated CSI trigger states, wherein the aperiodic CSI trigger state is associated with the associated CSI report configuration; and
mapping the CSI-RS resource to the one or more TCI states associated with the CSI-RS resource using the RRC message for aperiodic CSI-RS resource configuration.

6. The method of claim 4,
wherein each CSI report configuration of the one or more CSI report configurations includes a sequence of TCI state identifiers (IDs),
wherein each TCI state ID in the sequence of TCI state IDs explicitly references the one or more TCI states associated with each CSI-RS resource of the plurality of CSI-RS resources corresponding to the each CSI report configuration, and
wherein the identifying the CSI-RS resource includes:
receiving a downlink control information (DCI) including an identification of a scheduled trigger state in the subset of activated trigger states corresponding to the CSI-RS resource; and
mapping the CSI-RS resource to the one or more TCI states associated with the CSI-RS resource using the sequence of TCI state IDs included in a corresponding CSI report configuration of the one or more CSI report configurations defined by the scheduled trigger state.

7. A method of wireless communications at a user equipment (UE), comprising:
receiving a radio resource control (RRC) message including an aperiodic triggering state configuration configuring a set of trigger states, one or more trigger states of the set of trigger states including association of at least one channel state information-reference signal (CSI-RS) resource with at least two transmission configuration indicator (TCI) states;
receiving a triggering downlink control information (DCI) identifying a trigger state of the set of trigger states that identifies the at least one CSI-RS resource associated with the at least two TCI states; and
receiving the at least one CSI-RS resource by application of one or more quasi-co-location (QCL) assumptions according to a relationship between a scheduling offset and a threshold beam switch time.

8. The method of claim 7, wherein the application of the one or more QCL assumptions includes:
application of the one or more QCL assumptions associated with the at least two TCI states when the relationship includes the scheduling offset being greater than or equal to a threshold value associated with the threshold beam switch time.

9. The method of claim 7, wherein the application of the one or more QCL assumptions includes:
application of two or more QCL assumptions for the reception of the CSI-RS resource when the relationship includes the scheduling offset being less than a threshold value associated with the threshold beam switch time.

10. The method of claim 9, wherein the application of the two or more QCL assumptions includes:
identifying at least one downlink transmission within a same set of symbols as the CSI-RS resource; and
determining that the at least one downlink transmission is associated with at least two downlink TCI states, wherein the two or more QCL assumptions are associated with the at least two downlink TCI states.

11. The method of claim 9, wherein the application of the two or more QCL assumptions includes:
identifying two or more downlink transmissions within a same set of symbols as the CSI-RS resource; and
determining that one or more downlink transmissions of the two or more downlink transmissions is associated with a single TCI state that is different from the single TCI state associated with one or more other downlink transmissions of the two or more downlink transmissions, wherein the two or more QCL assumptions are associated with the single TCI state of the two or more downlink transmissions.

12. The method of claim 9, wherein the application of the two or more QCL assumptions includes:

identifying two or more downlink transmissions within a same set of symbols as the CSI-RS resource, wherein the two or more downlink transmissions are associated with a same TCI state;

determining a first QCL assumption of the two or more QCL assumptions for application to a first port group of the at least one CSI-RS resource, wherein the first QCL assumption is associated with the same TCI state; and determining one or more default QCL assumptions of the two or more QCL assumptions for application to a second port group of the at least one CSI-RS resource, wherein the one or more default QCL assumptions are associated with shared channel downlink transmissions.

13. The method of claim 9, wherein the application of the two or more QCL assumptions includes:

failing to identify any additional downlink transmissions within a same set of symbols as the at least one CSI-RS resource; and determining two or more default QCL assumptions applicable for the two or more QCL assumptions, wherein the two or more default QCL assumptions are associated with shared channel downlink transmissions.

14. The method of claim 9, wherein the application of the two or more QCL assumptions includes application of one or more default QCL assumptions associated with shared channel downlink transmissions.

15. The method of claim 14, further including:

determining at least one TCI codepoint indicating two different TCI states, wherein two or more default QCL assumptions of the one or more default QCL assumptions are based on two or more TCI states corresponding to a lowest codepoint containing two diverse TCI states among all TCI codepoints.

16. The method of claim 14, further including:

receiving a control resource set (CORESET) configuration including one or more CORESET identifiers (IDs) of a first CORESET pool index and one or more additional CORESET IDs of a second CORESET pool index, wherein a first default QCL assumption of the one or more QCL assumptions is based on a first lowest CORESET ID of the first CORESET pool index monitored in a first latest slot associated with the first CORESET pool index, and wherein a second default QCL assumption of the one or more QCL assumptions is based on a second lowest CORESET ID of the second CORESET pool index monitored in a second latest slot associated with the second CORESET pool index.

17. An apparatus configured for wireless communication, the apparatus comprising:

at least one processor; and at least one memory comprising instructions, wherein the at least one processor is configured to execute the instructions and cause the apparatus to:

receive a channel state information-reference signal (CSI-RS) resource configuration, wherein the CSI-RS resource configuration configures an association of at least one CSI-RS resource of a plurality of CSI-RS resources with at least two transmission configuration indicator (TCI) states;

identify a CSI-RS resource of the plurality of CSI-RS resources; and receive the identified CSI-RS resource using a quasi-co-location (QCL) assumption corresponding to one or more TCI states associated with the identified CSI-RS resource.

18. The apparatus of claim 17, wherein the CSI-RS resource configuration is received in a radio resource control (RRC) message for semi-persistent CSI-RS resource configuration, wherein the semi-persistent CSI-RS resource configuration configures a number of TCI states associated with each CSI-RS resource of the plurality of CSI-RS resources, and wherein the configuration of the at least one processor to execute the instructions and cause the apparatus to identify the CSI-RS resource includes configuration of the at least one processor to execute the instructions and cause the apparatus to:

receive a medium access control-control element (MAC-CE) including one or more identified TCI states; and map the one or more identified TCI states to the CSI-RS resource using the number of TCI states associated with each CSI-RS resource in the RRC message for semi-persistent CSI-RS resource configuration.

19. The apparatus of claim 17, wherein the CSI-RS resource configuration is received in a medium access control-control element (MAC-CE), wherein the MAC-CE includes an identification of a CSI-RS resource set and a plurality of TCI states associated with the plurality of CSI-RS resources defined in the CSI-RS resource set, and an indication of the at least two TCI states from the plurality of TCI states that are associated with a single CSI-RS resource.

20. The apparatus of claim 17, wherein the CSI-RS resource configuration is received in a radio resource control (RRC) message for an aperiodic CSI-RS resource configuration, wherein the RRC message includes a plurality of CSI trigger states, wherein each CSI trigger state of the plurality of CSI trigger states defines one or more CSI report configurations, and wherein each CSI report configuration of the one or more CSI report configurations defines a corresponding CSI-RS resource set including one or more corresponding CSI-RS resources, and wherein the apparatus further includes configuration of the at least one processor to execute the instructions and cause the apparatus to:

receive a medium access control-control element (MAC-CE) that activates a subset of activated CSI trigger states of the plurality of triggers states for aperiodic CSI-RS reporting; and transmit a CSI report in response to the identified CSI-RS resource.

21. The apparatus of claim 20, wherein the RRC message for the aperiodic CSI-RS resource configuration further includes:

a number of TCI states associated with each CSI-RS resource of the plurality of CSI-RS resources in an associated CSI report configuration for an aperiodic CSI trigger state of the subset of activated CSI trigger states; and a sequence of TCI state identifiers (IDs) identifying at least one TCI state associated with the each CSI-RS resource, including the at least one CSI-RS resource associated with the at least two TCI states; and wherein the configuration of the at least one processor to execute the instructions and cause the apparatus to identify the CSI-RS resource includes configuration of the at least one processor to execute the instructions and cause the apparatus to:
  receive a downlink control information (DCI) identifying the aperiodic CSI trigger state of the subset of activated CSI trigger states, wherein the aperiodic CSI trigger state is associated with the associated CSI report configuration; and
  map the CSI-RS resource to the one or more TCI states associated with the CSI-RS resource using the RRC message for aperiodic CSI-RS resource configuration.

22. The apparatus of claim 20,
wherein each CSI report configuration of the one or more CSI report configurations includes a sequence of TCI state identifiers (IDs),
wherein each TCI state ID in the sequence of TCI state IDs explicitly references the one or more TCI states associated with each CSI-RS resource of the plurality of CSI-RS resources corresponding to the each CSI report configuration, and
wherein the configuration of the at least one processor to execute the instructions and cause the apparatus to identify the CSI-RS resource include configuration of the at least one processor to execute the instructions and cause the apparatus to:
  receive a downlink control information (DCI) including an identification of a scheduled trigger state in the subset of activated trigger states corresponding to the CSI-RS resource; and
  map the CSI-RS resource to the one or more TCI states associated with the CSI-RS resource using the sequence of TCI state IDs included in a corresponding CSI report configuration of the one or more CSI report configurations defined by the scheduled trigger state.

23. The apparatus of claim 17 further comprising:
a receiver via which the CSI-RS resource configuration and the identified CSI-RS resource are received, wherein the apparatus is configured as a user equipment (UE).

24. An apparatus configured for wireless communication, the apparatus comprising:
at least one processor; and
at least one memory comprising instructions,
wherein the at least one processor is configured to execute the instructions and cause the apparatus to:
  receive a radio resource control (RRC) message including an aperiodic triggering state configuration configuring a set of trigger states, one or more trigger states of the set of trigger states including association of at least one channel state information-reference signal (CSI-RS) resource with at least two transmission configuration indicator (TCI) states;
  receive a triggering downlink control information (DCI) identifying a trigger state of the set of trigger states that identifies the at least one CSI-RS resource associated with the at least two TCI states; and
  receive the at least one CSI-RS resource by application of one or more quasi-co-location (QCL) assumptions according to a relationship between a scheduling offset and a threshold beam switch time.

25. The apparatus of claim 24, wherein the application of the one or more QCL assumptions includes application of the one or more QCL assumptions associated with the at least two TCI states when the relationship includes the scheduling offset being greater than or equal to a threshold value associated with the threshold beam switch time.

26. The apparatus of claim 24, wherein the application of the one or more QCL assumptions includes application of two or more QCL assumptions for the reception of the CSI-RS resource when the relationship includes the scheduling offset being less than a threshold value associated with the threshold beam switch time.

27. The apparatus of claim 26, wherein the application of the two or more QCL assumptions includes configuration of the at least one processor to execute the instructions and cause the apparatus to:
  identify at least one downlink transmission within a same set of symbols as the CSI-RS resource; and
  determine that the at least one downlink transmission is associated with at least two downlink TCI states, wherein the two or more QCL assumptions are associated with the at least two downlink TCI states.

28. The apparatus of claim 26, wherein the application of the two or more QCL assumptions includes configuration of the at least one processor to execute the instructions and cause the apparatus to:
  identify two or more downlink transmissions within a same set of symbols as the CSI-RS resource; and
  determine that one or more downlink transmissions of the two or more downlink transmissions is associated with a single TCI state that is different from the single TCI state associated with one or more other downlink transmissions of the two or more downlink transmissions, wherein the two or more QCL assumptions are associated with the single TCI state of the two or more downlink transmissions.

29. The apparatus of claim 26, wherein the application of the two or more QCL assumptions includes configuration of the at least one processor to execute the instructions and cause the apparatus to:
  identify two or more downlink transmissions within a same set of symbols as the at least one CSI-RS resource, wherein the two or more downlink transmissions are associated with a same TCI state;
  determine a first QCL assumption of the two or more QCL assumptions for application to a first port group of the at least one CSI-RS resource, wherein the first QCL assumption is associated with the same TCI state; and
  determine one or more default QCL assumptions of the two or more QCL assumptions for application to a second port group of the at least one CSI-RS resource, wherein the one or more default QCL assumptions are associated with shared channel downlink transmissions.

30. The apparatus of claim 26, wherein the application of the two or more QCL assumptions includes configuration of the at least one processor to execute the instructions and cause the apparatus to:
  fail to identify any additional downlink transmissions within a same set of symbols as the at least one CSI-RS resource; and
  determine two or more default QCL assumptions applicable for the two or more QCL assumptions, wherein the two or more default QCL assumptions are associated with shared channel downlink transmissions.

31. The apparatus of claim 26, wherein the application of the two or more QCL assumptions includes application of one or more default QCL assumptions associated with shared channel downlink transmissions.

32. The apparatus of claim 31, further including configuration of the at least one processor to execute the instructions and cause the apparatus to determine at least one TCI codepoint indicating two different TCI states, wherein two or more default QCL assumptions of the one or more default QCL assumptions are based on two or more TCI states corresponding to a lowest codepoint containing two diverse TCI states among all TCI codepoints.

33. The apparatus of claim 31, further including configuration of the at least one processor to execute the instructions and cause the apparatus to:
   receive a control resource set (CORESET) configuration including one or more CORESET identifiers (IDs) of a first CORESET pool index and one or more additional CORESET IDs of a second CORESET pool index,
   wherein a first default QCL assumption of the one or more QCL assumptions is based on a first lowest CORESET ID of the first CORESET pool index monitored in a first latest slot associated with the first CORESET pool index, and
   wherein a second default QCL assumption of the one or more QCL assumptions is based on a second lowest CORESET ID of the second CORESET pool index monitored in a second latest slot associated with the second CORESET pool index.

34. The apparatus of claim 24 further comprising:
   a receiver via which the RRC message, the triggering DCI, and the at least one CSI-RS resource are received, wherein the apparatus is configured as a user equipment (UE).

* * * * *